United States Patent [19]
Masuko et al.

[11] Patent Number: 5,239,536
[45] Date of Patent: Aug. 24, 1993

[54] LOOP TEST SYSTEM IN AN INTEGRATED CIRCUIT

[75] Inventors: Hiroyo Masuko, Kawasaki; Ryouzi Takano, Yokohama; Takashi Hatano, Machida; Kiyohumi Mitsuze, Yokohama, all of Japan; Ang Kar Keong, Singapore, Singapore

[73] Assignee: Fujitsu Limited, Kanagawa, Japan

[21] Appl. No.: 671,614

[22] Filed: Mar. 19, 1991

[30] Foreign Application Priority Data

Mar. 19, 1990 [JP] Japan .................................. 2-66836

[51] Int. Cl.$^5$ ................................................. H04J 1/16
[52] U.S. Cl. ........................................... 370/15; 379/5; 371/22.6
[58] Field of Search ................... 370/14, 15, 16, 16.1; 375/3.1, 10; 379/5; 371/20.5, 22.6, 61

[56] References Cited

U.S. PATENT DOCUMENTS

| | | | |
|---|---|---|---|
| 4,059,729 | 11/1977 | Eddy et al. | 370/55 |
| 4,149,038 | 4/1979 | Pitroda et al. | 370/14 |
| 4,815,119 | 3/1989 | Mills | 340/825.52 |
| 4,845,735 | 7/1989 | Payne et al. | 379/5 |

Primary Examiner—Douglas W. Olms
Assistant Examiner—Shick Hom
Attorney, Agent, or Firm—Nikaido, Marmelstein, Murray & Oram

[57] ABSTRACT

In the transmission data test mode of the integrated circuit, the user sets test transmission data as transmission data and supplies a transmission data test command to a returning unit, whereby the test transmission data output from the transmission unit is returned by the returning unit and received by the reception unit. In that case, a format converting unit receives the test transmission data in the data format of the transmission data. Then, by comparing the test transmission data and data received by the reception unit, the user can carry out a transmission data test. In the reception data test mode of the integrated circuit, the user sets test reception data, designates a reception timing and supplies a reception data test command to a test reception data input unit, whereby the test reception data is received by the reception unit via the test reception data input unit. Then, by comparing the test reception data and data received by the reception unit and corresponding to the designated reception timing, the user can perform a reception data test.

7 Claims, 7 Drawing Sheets

LOOP TEST SYSTEM IN AN INTEGRATED CIRCUIT

BACKGROUND OF THE INVENTION

1. Field of the Invention

The present invention relates to a loop test system for testing the operation of an LSI (large scale integrated circuit) having a function of receiving data such as communication data and outputting it to an external circuit so that the external circuit can perform data processing, and a function of receiving the data from the external circuit and transmitting.

2. Description of the Related Art

In the data communication field, many LSIs have been developed which have the above function of receiving communication data or the like and outputting it to an external circuit so that the external circuit can perform data processing, and the function of receiving transmission data from the external circuit and transmitting it.

In some application fields, such as when an LSI is disposed on a line of a data communication network, an LSI self-test is frequently indispensable to ensure system performance.

This test must determine whether or not the LSI correctly receives the reception data and whether or not the LSI correctly transmits the transmission data.

Thus, an LSI having a data transmission and a reception function is provided with a RAM (random access memory) at its inside or outside. This RAM temporarily stores reception data and transmission data. If the formats of the reception data and the transmission data are the same, test data is set in the transmission data area of the RAM and then output from the LSI. The output data is then returned to the receiving side of the LSI and stored in the reception data area of the RAM. The contents of the reception data area and the contents of the transmission area are then compared. Thus, a self-diagnosis test is carried out by the LSI alone without requiring an interface for receiving test data. This might be called a loop test.

Figure 2A:
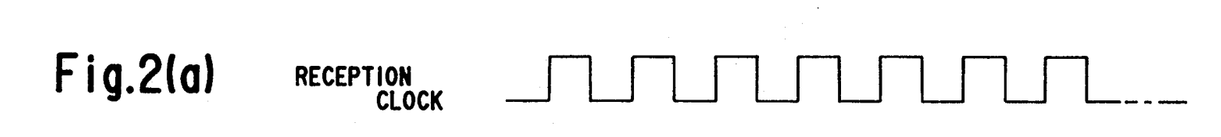
FIGS. 2A through 2D are schematic diagrams used to explain the phase difference between reception data and transmission data.
Figure 2B:
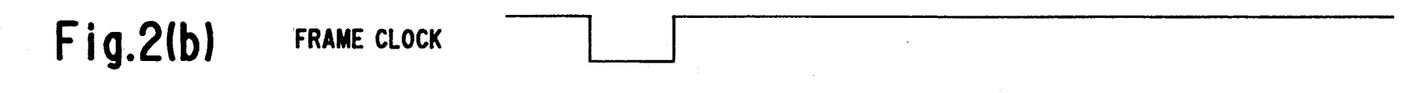
Figure 2C:
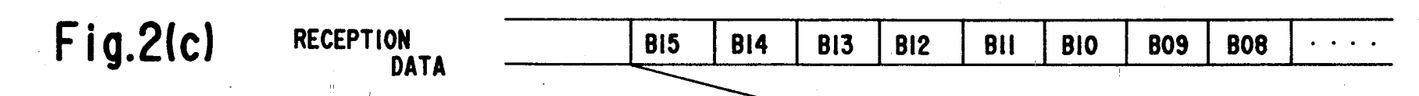
Figure 2D:
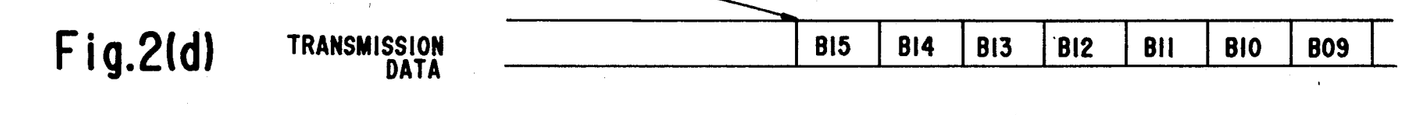

The phase of the reception data (hereinafter referred to as reception data RDAT) and the phase of the transmission data (hereinafter referred to as transmission data SDAT) treated by the LSI do not always exactly coincide. The reception data RDAT and the transmission data SDAT are time division data of which a plurality of lines are multiplexed. As shown in FIG. 2, reception data RDAT of FIG. 2C is transferred in bit units (B15, B14, ...) in synchronism with a predetermined reception clock of, for example, FIG. 2A. Further, the reception data RDAT is transferred in synchronism with the predetermined frame clock of FIG. 2B. Thus, information of a certain unit is transferred. As shown in FIG. 2D, the transmission data SDAT is transferred with its phase advanced by 2 bits from the phase of the reception data RDAT of FIG. 2C.

Figure 1:
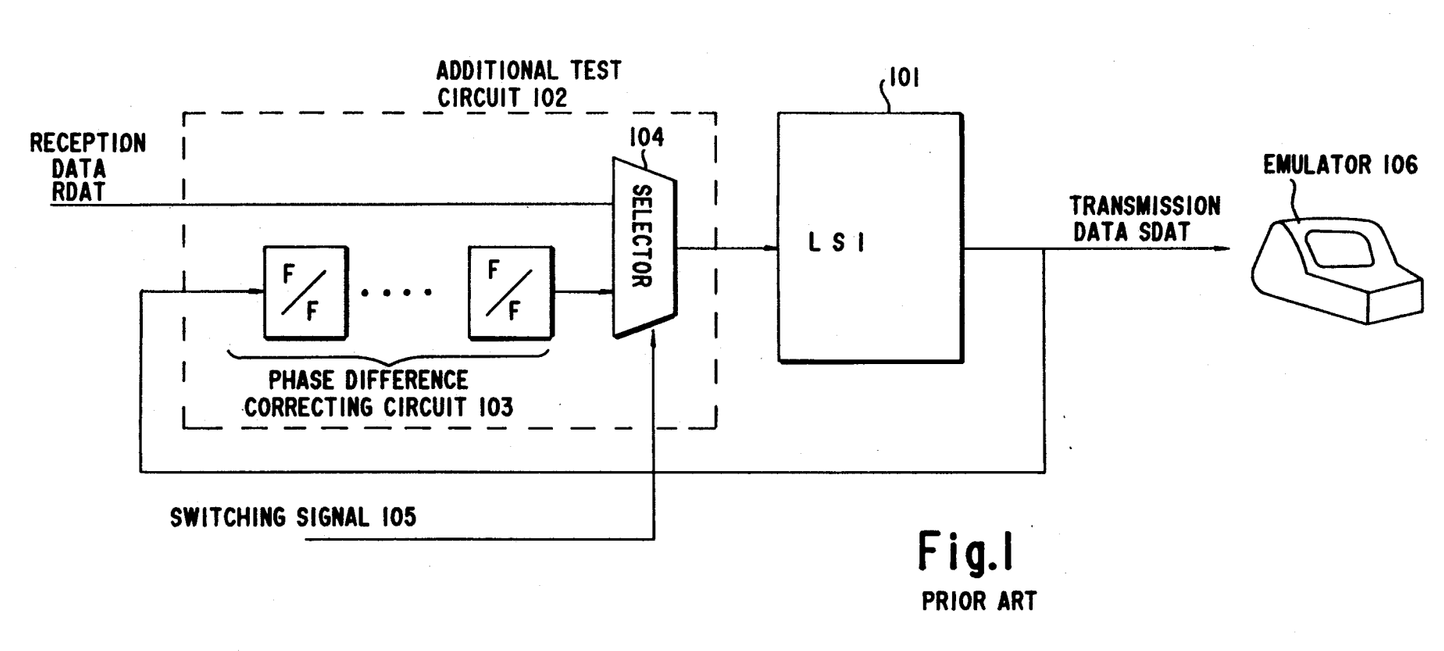
FIG. 1 is a schematic block diagram showing an example of a test system according to the prior art.

Accordingly, if the transmission data SDAT is simply returned to the receiving side of the LSI, the LSI cannot correctly receive it as reception data RDAT. Therefore, as shown in FIG. 1, an additional test circuit 102 for returning the transmission data SDAT to a reception side LSI 101 must be conventionally provided at the outside of the LSI 101.

More specifically, test data output from the LSI 101 as transmission data SDAT is supplied to a phase difference correcting circuit 103 composed of, for example, a plurality of flip-flops (F/Fs) within the additional test circuit 102. This correcting circuit 103 matches the phase of the transmission data SDAT with that of the reception data RDAT and then inputs it through a selector 104 to the receiving side of the LSI 101. In normal operation, the selector 104 is switched by a switching signal 105, and the reception data RDAT is input from the outside through the selector 104 to the receiving side of the LSI 101.

As described above, when there is a phase difference between the reception data RDAT and the transmission data SDAT, a circuit such as the additional test circuit 102 must be provided to absorb it. Therefore, when the test is performed with the system including the LSI 101 operating, a cumbersome procedure is needed.

Further, if the phase difference is large, the scale of the additional test circuit 102 must be very large.

Furthermore, in an LSI having the above data input and output functions, data formats of the reception data RDAT and the transmission data SDAT are not always the same. Therefore, reception and the transmission operations are often carried out in different formats due to differences among lines connected to the outside or the like.

In this case, even if the test additional circuit 102 shown in FIG. 1 returns the transmission data SDAT, the LSI 101 cannot receive it, so the test cannot be performed by the LSI alone. Consequently, as shown in FIG. 1, an emulator 106 exclusively used to test the transmission data SDAT or the like must be provided, making a complex test procedure unavoidable.

The increased scale of the test apparatus and the complicated test procedure are large obstacles to development of a self-test of an on-line LSI, as in the field of data communications.

SUMMARY OF THE INVENTION

In view of this background, the present invention is designed to perform an LSI loop test without any special test apparatus, even when 1) there is a phase difference between transmission and reception data and 2) transmission and reception data formats are different.

The present invention is based on a loop test apparatus in an integrated circuit including a receiving unit for receiving reception data, a transmission unit for transmitting transmission data, and a phase difference adding unit for adding a phase difference between a reception timing of reception data and a transmission timing of transmission data and transmitting the transmission data to the outside.

The integrated circuit includes a loop-back unit for looping-back transmission data, transmitted from the transmission unit and not processed by the phase difference adding unit, to the receiving unit as test transmission data on the basis of a transmission data test command issued from the outside.

It also includes a test reception data input unit for inputting test reception data to the receiving unit from the outside at the reception timing designated from the outside on the basis of a reception data test command issued from the outside.

According to the present invention, in addition to the above arrangement, the receiving unit may include a format converting unit for receiving, according to the data format of the transmission data, the test transmission data returned by the returning unit on the basis of the transmission data test command issued from the outside of the integrated circuit.

In this arrangement of the present invention, the reception data and the transmission data are time division data with a multiframe arrangement in which data of a plurality of lines are multiplexed. The designation of reception timing from the outside is similar to the case where a reception data test command is issued from the outside of the integrated circuit and is performed as an operation for designating a predetermined frame number and line number. The test reception data input unit inputs the test reception data to the reception unit from the outside of the integrated circuit when reception data corresponding to the instructed predetermined frame number and line number is received. Further, when data formats are not the same, the format converting unit is adapted to mask the test transmission data returned by the returning unit by a bit mask pattern matched with the data format of transmission data on the basis of the transmission data test command issued from the outside of the integrated circuit.

According to this arrangement of the present invention, even if there is a phase difference between the reception data and the transmission data, it becomes possible to perform a transmission data test on the integrated circuit without providing outside the integrated circuit a circuit for absorbing the phase difference.

Further, even when the formats of the reception data and the transmission data are different, the receiving unit can correctly receive the test transmission data when testing the transmission data. Thus, without providing an exclusive emulator or the like at the outside, it is possible to easily perform a transmission data test on the integrated circuit in the integrated circuit alone by utilizing a normal transmission operation and reception operation in the integrated circuit.

In the reception data test in the integrated circuit, individual receiving timings and corresponding test reception data can be set, whereby reception data test can be carried out in detail.

Also in this case, it is possible to easily perform the reception data test of the integrated circuit in the integrated circuit alone by utilizing the normal reception operation.

As the loop-back unit and test receipt data input unit can be formed only by a simple selector and gate, a function of the present invention can be achieved without increasing a scale of an integrated circuit and manufacturing cost.

BRIEF DESCRIPTION OF THE DRAWINGS

A better understanding of the objects, features and advantages of the present invention can be gained from the following detailed description of the preferred embodiments, in conjunction with the accompanying drawings, wherein.

DESCRIPTION OF THE PREFERRED EMBODIMENTS

Figure 3:
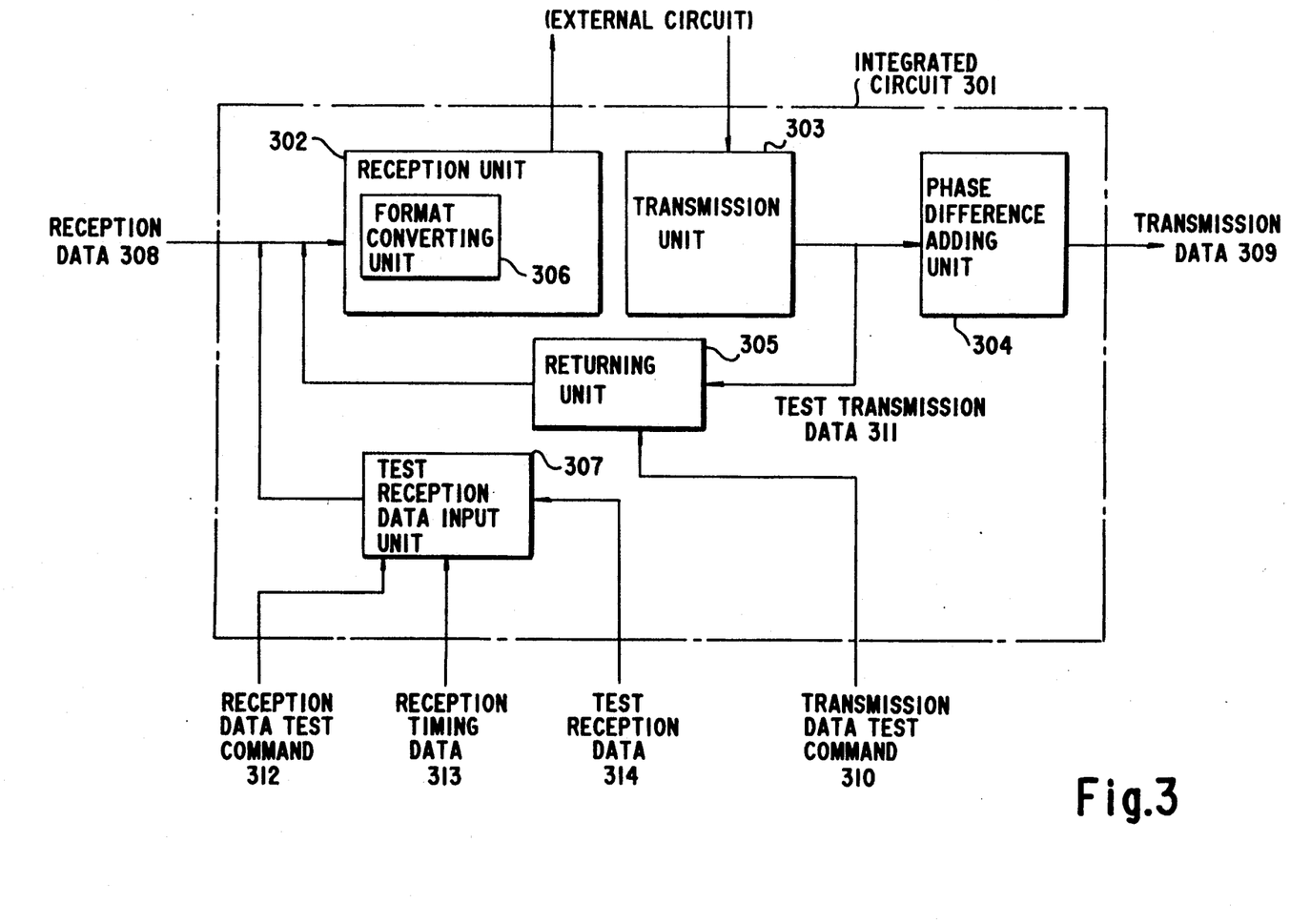
FIG. 3 is a schematic block diagram used to explain a principle of the present invention.

The principle of the present invention is now described. FIG. 3 is a schematic block diagram for explaining the principle of the present invention. The present invention is based on a loop test system in an integrated circuit 301 comprising a reception unit 302, a transmission unit 303, a phase difference adding unit 304, a returning unit 305 and a test reception data input unit 307. The reception unit 302 receives receiving data 308 such as communication data or the like from, for example, a terminal of the other party, and outputs it to, for example, an external circuit, so that the external circuit can process it. The transmission unit 303 receives transmission data 309 from, for example, the external circuit and transmits it to, for example, the terminal of the other party. The phase difference adding unit 304 adds the phase difference between the reception timing of the reception data 308 and the transmission timing of the transmission data 309 to transmission timing of the transmission data 309.

The returning or loop-back unit 305 returns transmission data, which is transmitted from the transmission unit 303 and not yet input to the phase difference adding unit 304, to the receiving unit 302 as test transmission data 311 on the basis of transmission data test command 310 issued from the outside of the integrated circuit 301 to start the loop test.

A format converting unit 306 provided within the receiving unit 302 receives the test transmission data 311 returned by the returning unit 305 in the data format of the transmission data 302 to determine data formats. This portion is a bit mask pattern of, for example, the transmission data 309.

On the other hand, the test reception data input unit 307 provided within the integrated circuit 301 inputs test reception data 314 to the receiving unit 302 from the outside of the integrated circuit 301 at a receiving timing 313 instructed from the outside of the integrated circuit 301 on the basis of the reception data test command 312 issued from the outside of the integrated circuit 301. If the reception data 308 or the like is time division data of multiframe arrangement in which data of, for example, a plurality of lines are multiplexed, the designation of the reception timing 313 is realized as an operation for designating, for example, predetermined frame number and line number (DLC number). Then, the test reception data input unit 307 inputs the test reception data 314 to the receiving unit 302 at the timing in which reception data of the designated predetermined frame number and line number are received.

The principle of the thus arranged circuit of the present invention is described next.

To execute the transmission data test in the integrated circuit 301, the user sets the test transmission data 311 as the transmission data with a data processing external circuit or the like and transmits the transmission data test command 310 to the returning unit 305. In the integrated circuit 301, the transmission unit 303 transmits the test transmission data 311 by an ordinary transmitting operation, and this test transmission data 311 is returned by the returning unit 305. Then, the receiving unit 302 receives the thus returned test transmission data 311 by an ordinary receiving operation. In this case, the format converting unit 306 receives the test transmission data 311 in the data format of the transmission data 309. On the basis of these operations, the user compares the test transmission data 311 with the data received at the receiving unit 302 via an external data processing circuit or the like to perform a transmission data test on the integrated circuit 301.

To carry out the reception data test of the integrated circuit 301, the user sets the test reception data 314, designates the reception timing 313 and inputs the reception data test command 312 to the test reception data input unit 307. The test reception data 314 is input via the test reception data input unit 307 and the receiving unit 302 receives the data 314 by the ordinary receiving operation. On the basis of these operations, the user compares the test reception data 314 and data corresponding to the reception timing 313 received at and designated by the receiving unit 302 via the external data processing circuit or the like to perform the reception data test of the integrated circuit 301.

As described above, in the transmission data test of the integrated circuit 301, the test transmission data 311 is output prior to the phase difference adding unit 304 shown in FIG. 3. The phase difference adding unit 304 is generally provided in an integrated circuit to treat transmission and reception data having a phase difference therebetween. Then, the test transmission data 311 is returned to the reception unit 302 side by the returning or loop-back unit 305. Therefore, a circuit for absorbing the phase difference is not required outside the integrated circuit 301. Such effect can be achieved by returning the test transmission data 311 to the inside of the integrated circuit 301. Further, the receiving unit 302 can receive, in the data format of the transmission data 309, the test transmission data 311 returned via the format converting unit 306. More specifically, even when the data format of the transmission data 309 is different from that of the reception data 308, the receiving unit 302 can properly receive the test transmission data 311 in testing the transmission data. As described above, the user can easily carry out the transmission data test on the integrated circuit 301 by using the integrated circuit 301 alone and by utilizing the standard transmission operation and receiving operation in the integrated circuit 301.

In testing the reception data of the integrated circuit 301, the user may designate the proper receiving timing 313 and may set the corresponding test reception data 314. Thus, the user can easily carry out the reception data test of the integrated circuit 301 by using the integrated circuit 301 alone and by utilizing the ordinary reception operation in the integrated circuit.

A preferred embodiment of the present invention is described hereinafter with reference to the drawings.

Figure 4:
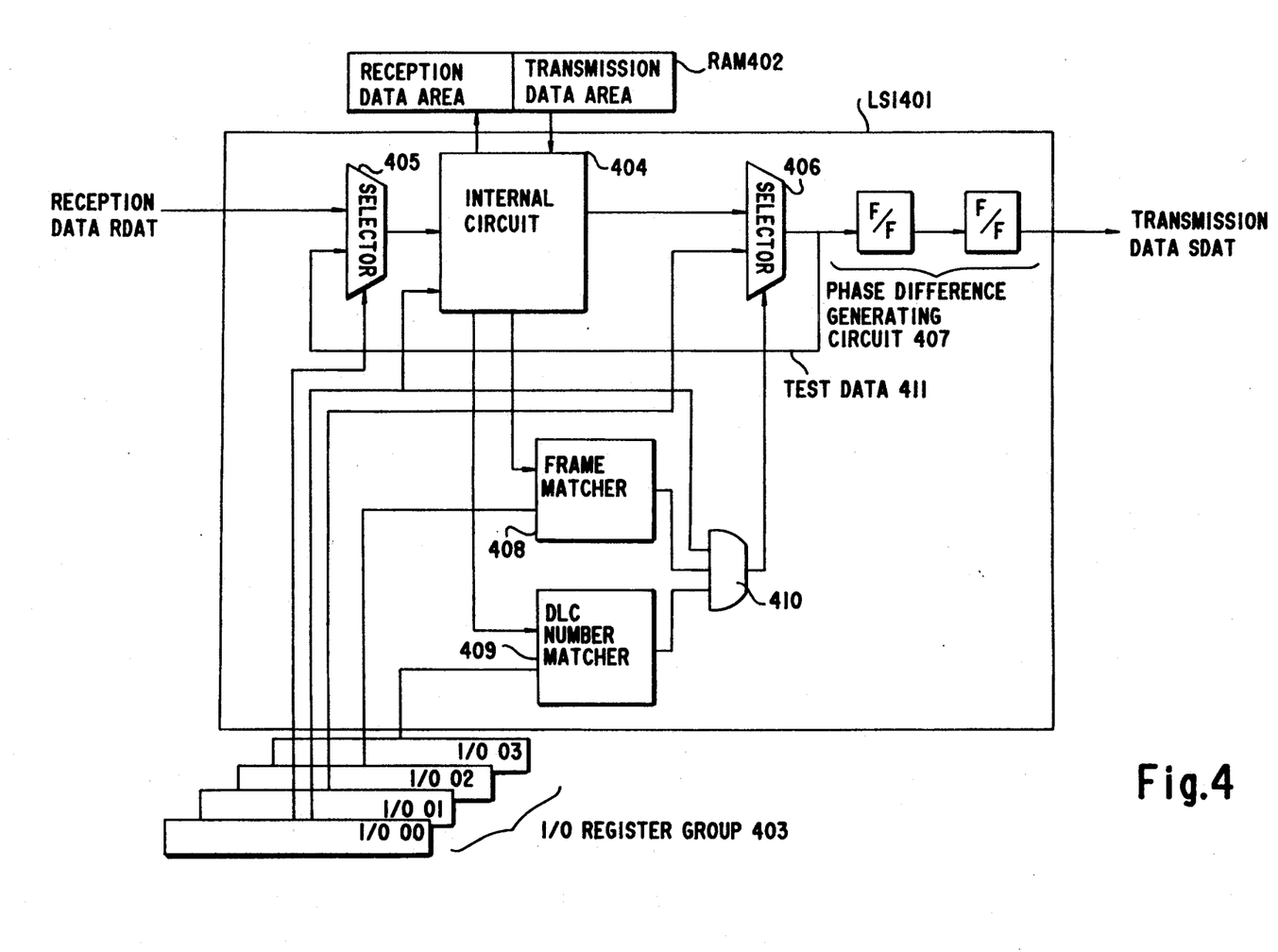
FIG. 4 is a schematic block diagram showing the preferred embodiment of the present invention.

FIG. 4 is a schematic diagram of the preferred embodiment of the present invention, which is realized by the combination of an LSI 401, a RAM 402 and an I/0 register group 403.

Reception data RDAT and transmission data SDAT of this embodiment are serial line data and data in which a variety of control data comprising 64 lines (e.g. outgoing call data) interchanged between, for example, the subscriber and the switchboard, between the switchboards or the like are time division multiplexed.

The reception data RDAT, which is serial data input from an external line or the like, is latched in the LSI 401 and input through a selector 405 to an internal circuit 404, in which data processing previously determined as the function of the LSI 401 is executed. This data processing may be, for example, a noise preventing processing. More specifically, with respect to the reception data RDAT, the data check has been carried out by using a work area (not shown) of an external RAM 402, and after the data check has been carried out a plurality of times, reception data RDAT is written in a receiving data area in the RAM 402.

The reception data RDAT written in this work area is read out therefrom by an external circuit (not shown) and undergoes necessary data processing (e.g. a call control). Then, in a transmission data area of the RAM 402 from the external circuit, processed transmission data SDAT to be transmitted is written conversely.

The transmission data SDAT written in this area is read out by the internal circuit 404 of the LSI 401 and output to the outside via the selector 406. A phase difference generating circuit 407 is composed of flip-flops (F/Fs) and adds a phase difference different from that of the reception data RDAT to the transmission data SDAT by adjusting an output timing of the transmission data SDAT. This phase difference generating circuit 407 is generally provided in an LSI for treating transmission and reception data having a phase difference therebetween.

The selector 406 is provided at the output side of the internal circuit 404 as described above, and the output thereof is returned or looped-back to the selector 405 side as test data 411 and input through the selector 405 to the internal circuit 404 when the loop test described later is performed.

The I/O register group 403 is connected to the outside of the LSI 401. It is composed of four registers I/O 00 to I/O 03.

Register I/O 00 stores a loop test flag for determining whether or not the loop test is carried out and a test-kind flag for determining whether the transmission data test or the reception data test is carried out when the loop test is carried out. The loop test flag is set to "1" when the loop test has been carried out and to "0" when it has not been carried out. The test-kind flag is set to "0" when the transmission data test has been carried out and to "1" when the reception data test has been carried out.

The register I/O 01 stores test reception data input via the selector 406 in the loop test of the reception data.

The register I/O 02 stores a frame number (described later) to be tested in the loop test of reception data.

The register I/O 03 stores a line number (DLC number, referred to later) to be tested in the loop test of reception data.

A frame matcher 408 within the LSI 401 compares the present frame number output from the internal circuit 404 with a frame number input from the register I/O 02, and outputs a high level signal when they coincide.

A DLC number matcher 409 within the LSI 401 compares the present DLC number output from the internal circuit 404 and the DLC number input from the register I/O 02 and outputs a high level signal when they coincide.

An AND circuit 410 allows the selector 406 to select the test reception data from the register I/O 01 when the test kind flag from the register I/O 00 is "1", that is, when the reception data is designated and when both outputs of the frame matcher 408 and the DLC number matcher 409 are at high level.

The internal circuit 404 changes an inside bit mask pattern, referred to later, when the test kind flag from the register I/O 00 is "0", that is, when the transmission data test has been designated.

Figure 5:
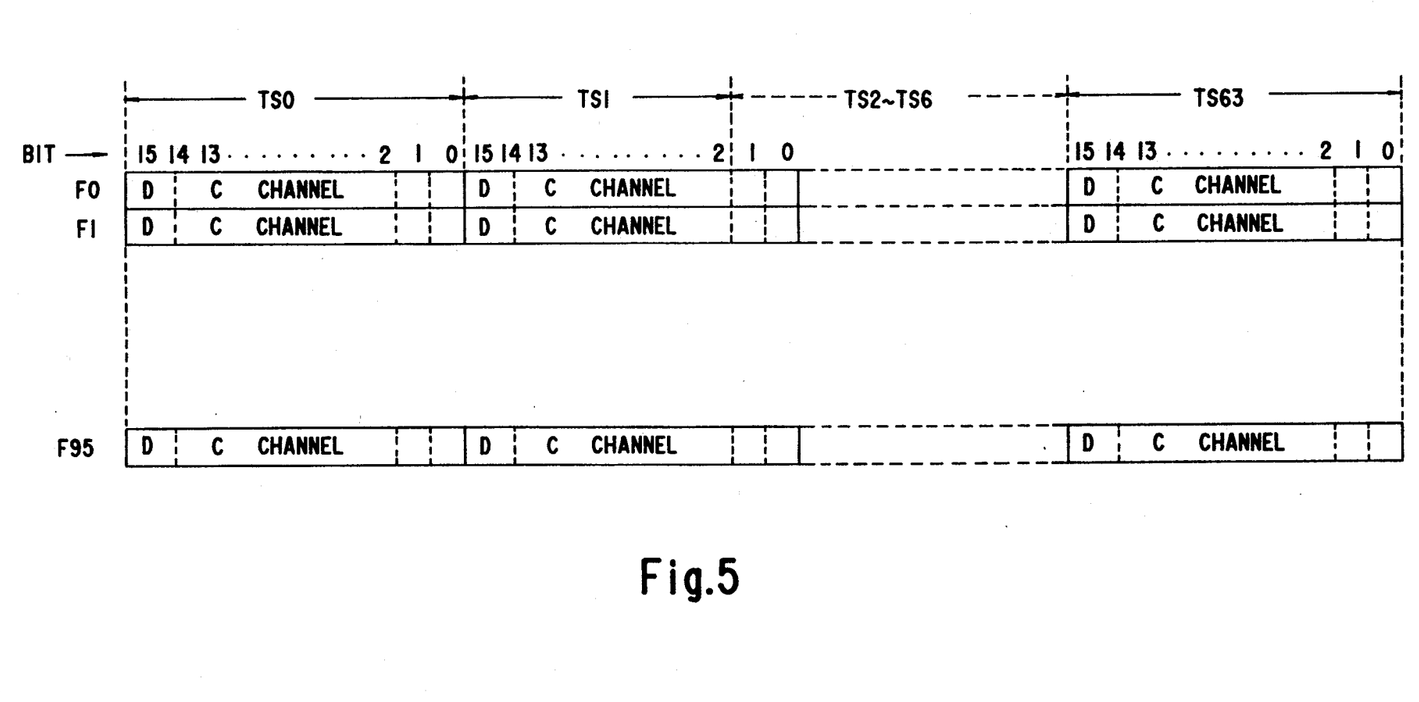
FIG. 5 is a schematic diagram showing a multiframe format of reception/transmission data.

FIG. 5 shows the multiframe format of the reception data RDAT or the transmission data SDAT of FIG. 4.

These two formats employ a multiframe arrangement in which the frame changes from frame F0 to frame F95 at a cycle of 125 μsec. per frame, returns again to frame F0 and then changes to frame F95. Further, each frame is divided to provide 64 time slots TS0 to TS63. Each time slot is formed of 16 bits of data.

Of the 16 bits of data of each time slot, bit 2 to bit 13 are called C channel data and bits 14 and 15 are data called D channel having HDLC (high level data link procedure) formats.

In this data arrangement, in the first frame F0 of 125 μsec., 16 bits of data of the time slot TS0 are transferred serially, 16 bits of data of time slots TS1 to TS63 are transferred serially and data of TS0 to TS63 of the frame F1, TS0 to TS63 of the frame F2, ..., TS0 to TS63 of the frame F95 in that order are sequentially transferred.

In this multiframe arrangement, one block of information corresponding to the time slot is expressed by the C channel data or the D channel data of a plurality of frames at every slot.

Data formats of the reception data RDAT and the transmission data SDAT are made different, but are not shown in detail herein. Accordingly, in this embodiment, different test data are used depending on the transmission data test and the reception data test, as will be described later.

Figure 6A:
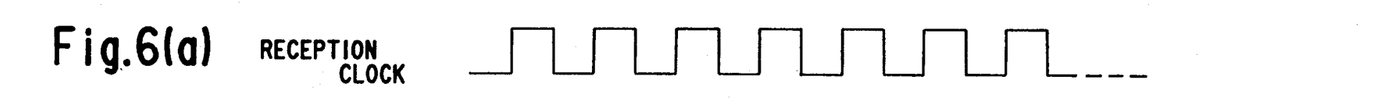
FIGS. 6A through 6E are schematic diagrams used to explain the phase difference between reception data, transmission data and test data.
Figure 6B:
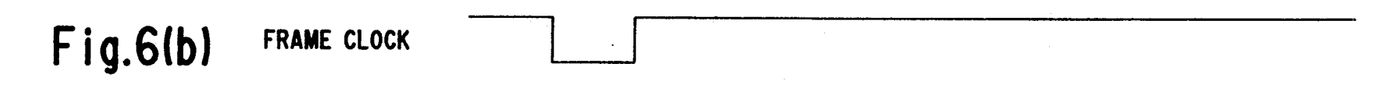
Figure 6C:
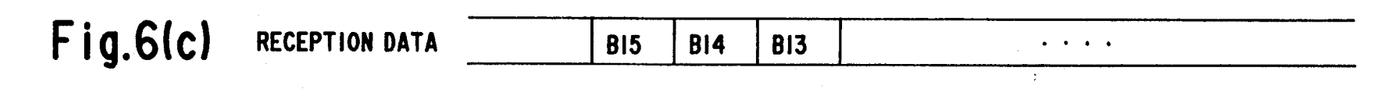
Figure 6D:
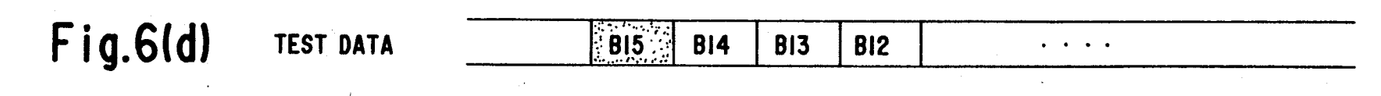
Figure 6E:
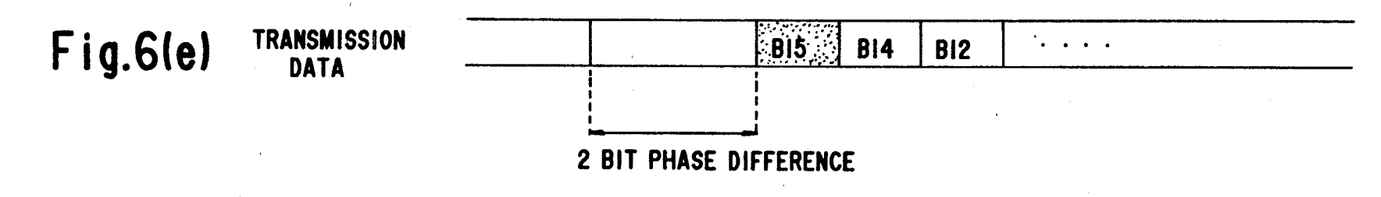

FIGS. 6A through 6E show the phase differences between the reception data RDAT, the transmission data SDAT and the test data 411. The reception data RDAT shown in FIG. 6C is transferred in the bit unit (B15, B14, ...) in synchronism with a constant receiving clock of, for example, FIG. 6A. Further, this reception data RDAT is transferred in synchronism with a constant frame clock of FIG. 6B, thereby transferring an information of one frame (one frame of F0 to F95 of FIG. 5). However, the transmission data SDAT is advanced, for example, in phase by two bits relative to the reception data RDAT of FIG. 6C, by the phase difference generating circuit 407 of FIG. 4 as shown in FIG. 6E, and output. This phase difference is not limited to a few bits, but may be of several frames. Since the test data 411 is output in the stage prior to the phase difference generating circuit 407 of FIG. 4, the phase thereof becomes the same as that of the reception data RDAT of FIG. 6C, as shown in FIG. 6D.

The test data 411 is output in the stage prior to the phase difference generating circuit 407 generally provided in the LSI 401 which treats transmission and reception data having a phase difference therebetween. Thus, a circuit such as the additional test circuit 102 in the example of the prior art shown in FIG. 1 which absorbs the phase difference is not required. This effect can be achieved when the test data 411 is returned to the inside of the LSI 401.

The practical loop test operation which is mainly composed of the operations of the selectors 405 and 406, the frame matcher 408, and the DLC number matcher 409, will be described next.

Figure 7:
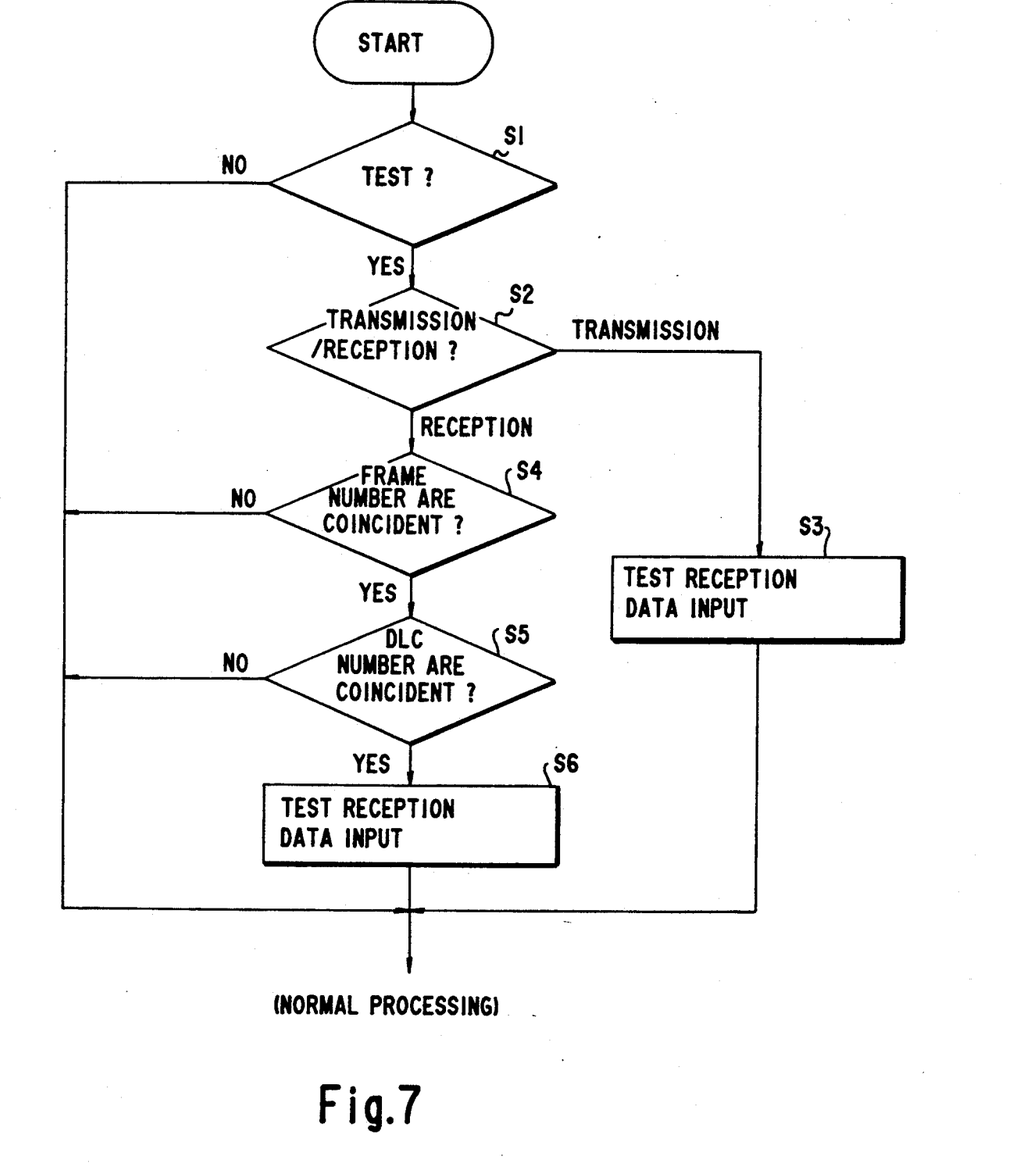
FIG. 7 is a flowchart to which references are made in explaining the operation of the loop test of the present invention.

FIG. 7 is a flow chart for explaining the operation of the LSI 401 in the loop test. These operations are repeatedly executed once each time a data processing of a time slot of the frames TS0 to TS63 in the frames F0 to F95 of FIG. 5 is executed within the internal circuit 404.

Referring to FIG. 7, following the Start of operation, it is determined at decision step S1 whether the present test mode is the loop test or not. This test mode is determined with reference to the loop test flag set in the register I/O 00 of the I/O register group 403.

When the user sets the flag "0", which indicates the normal processing as the loop test flag, a NO is output at step S1 of FIG. 7 and the selector 405 of FIG. 4 selects the reception data RDAT and the selector 406 selects the output of the internal circuit 404, thereby performing the ordinary data receiving and transmitting operations.

When the user set the flag "1", which indicates the loop test as the loop test flag, a YES is output at step S1 of FIG. 7. In the next decision step S2, it is determined whether the transmission data test or the reception data test is carried out. This is determined with reference to the test kind of flag set in the register I/O 00 of the I/O register group 403.

When the user sets the flag "0", which indicates the transmission data test as the kind of test flag, the processing proceeds to step S3, where the internal circuit 404 of FIG. 4 changes its inside bit mask pattern. The bit mask pattern is a mask pattern used to latch only a predetermined bit position of data of each time slot (see FIG. 5) input thereto via the selector 405 as effective data. Upon ordinary data processing, the internal circuit 404 selects the bit mask pattern matched with the data format of the reception data RDAT. However, in the transmission data test, since the transmission data is returned from the transmission side and latched, the internal circuit 404 changes the bit mask pattern to the pattern matched with the data format of the transmission data. This is the processing executed in step S3. With this processing, even when the data format of the transmission data SDAT is different from the data format of the reception data RDAT, the internal circuit 404 can properly input the test transmission data 411 into the reception data area of the RAM 402 upon a transmission data test.

After this processing, the internal circuit 404 is operated in a similar fashion to that of the ordinary data processing. In this case, the selector 405 selects the test data 411 on the basis of the loop test flag "1" derived from the register I/O 00 of the I/O register group 403 and which indicates the execution of the loop test. The AND circuit 410 is turned OFF on the basis of the kind of test flag "0" derived from the register I/O 000 and which indicates the execution of the transmission data test. Then the selector 406 selects the transmission data SDAT of the internal circuit 404 as the test data 411 on the basis of the kind of test flag "0". The internal circuit 404 transmits the test transmission data set in the transmission data area of the RAM 402 by the user, to the selector 406 by the ordinary transmission processing. This data is selected by the selector 406 as the test data 411 and is received by the receiving side of the internal circuit 404 via the selector 405. This data is then latched via the transmission data bit mask pattern and stored in the reception data area of the RAM 402. On the basis of these operations, the user compares the content of the transmitting data area with the content of the receiving data area of the RAM 402 to thereby test whether or not the internal circuit 404 has performed the correct transmission operation.

To carry out the receiving data test, the user previously sets the test kind flag "1" in the register I/O 00 of the I/O register group 403, sets the test receiving data in the register I/O 01, further stores the frame number to be tested in the register I/O 02 and then stores the DLC number to be tested in the register I/O 03. The frame number is any one of frames F0 to F95 of FIG. 5, and the DLC number is any one of time slots TS0 to TS63 of FIG. 5.

Thus, in the receiving data test mode, decision step S4 is carried out after the decision step S2. In decision step S4 by the frame matcher 408, the present frame number output derived from a counter circuit (not shown) in the internal circuit 404 and the frame number output which is input from the register I/O 02 are compared. The frame matcher 408 generates a high level signal when both data coincide. Thus, a YES is output at decision step S4 and the next decision step S5 is executed.

In the decision step S5, the DLC matcher 409 compares the present DLC number output from the internal circuit 404 and the DLC number output which is input from the register I/O 02, and the DLC matcher 409 derives the high level signal when the outputs coincide. Thus, a YES is output at decision step S5, and the next step S6 is executed.

In step S6, the AND circuit 410 is turned ON (because the kind of test flag input from the register I/O 00 is at high level "1") and on the basis of this ON output, the selector 406 selects the test reception data from the register I/O 01.

After this processing, the internal circuit 404 is operated similarly to the ordinary data processing mode, whereby the test reception data set previously in the register I/O 01 by the user is selected by the selector 406 as the test data 411 and is received by the receiving side of the internal circuit 404 via the selector 405. This data is latched via the receiving data bit mask pattern and then stored in the reception data area of the RAM 402. On the basis of these operations, by comparing the content of the test receiving data in the register I/O 01 and the contents of the reception data of the address corresponding to the frame number and the DLC number set in registers I/O 02 and I/O 03 of the reception data area of the RAM 402, the user can test whether or not the internal circuit 404 performs the correct receiving operation in the correct frame and in the correct time slot.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. An integrated circuit having a loop test apparatus for testing a transmission generation of said integrated circuit, said integrated circuit comprising:
   receiving means for receiving reception data;
   transmitting means for transmitting transmission data;
   phase difference adding means, connected to said transmitting means, for adding a phase difference, between reception timing of said reception data to transmission timing of said transmission data, to transmit said transmission data outside the integrated circuit; and
   returning means, connected to said receiving means and said transmitting means, for returning data, transmitted by said transmitting means and not yet input to said phase difference adding means, to said receiving means as test transmission data based on a transmission data test command issued from outside said integrated circuit.

2. An integrated circuit having a loop test apparatus for testing a reception operation of said integrated circuit, said integrated circuit comprising:
   receiving means for receiving reception data; and
   test reception data input means for inputting test reception data to said receiving means from outside said integrated circuit, said test reception data being input at a reception timing instructed from outside said integrated circuit based on a reception data test command issued from outside said integrated circuit.

3. An integrated circuit having a loop test apparatus for separately testing a reception operation and a transmission operation of said integrated circuit, said integrated circuit comprising:
   receiving means for receiving reception data;
   transmitting means for transmitting transmission data;
   phase difference adding means, connected to said transmitting means, for adding a phase difference of reception timing of said reception data to transmission timing of said transmission data to transmit said transmission data outside said integrated circuit;
   returning means, connected to said receiving means and said transmitting means, for returning transmission data transmitted from said transmitting means and not yet input to said phase difference adding means, to said receiving means as test transmission data based on a transmission data test command issued from outside said integrated circuit; and
   test reception data input means, connected to said receiving means, for inputting test reception data to said receiving means from outside said integrated circuit at a reception timing instructed from outside said integrated circuit based on a reception data test command issued from outside said integrated circuit.

4. An integrated circuit having a loop test apparatus according to claim 3, wherein said receiving means further includes format converting means for receiving the test transmission data returned by said returning means in a data format of said transmission data based on a transmission data test command issued from outside said integrated circuit.

5. An integrated circuit having a loop test apparatus according to claim 4, wherein said reception data and said transmission data are time division data of a multi-frame arrangement in which data of a plurality of lines are multiplexed.

6. An integrated circuit having a loop test apparatus according to claim 4, wherein
   designation of said reception timing from the outside of said integrated circuit where said reception data test command is issued is carried out as an operation for designating a predetermined frame number and line number, and said test reception data input means inputs said test reception data into said receiving means from outside said integrated circuit at a timing of receiving reception data corresponding to said designated predetermined frame number and line number.

7. An integrated circuit having a loop test apparatus according to claim 4, wherein said format converting means performs a masking of said test transmission data returned by said returning means by a bit mask pattern matched with the data format of transmission data based on a transmission data test command issued from outside said integrated circuit.

* * * * *